United States Patent [19]

Wolford

[11] 4,423,024

[45] Dec. 27, 1983

[54] SELECTIVE CONVERSION OF CHLORINATED ALKANES TO HYDROGEN CHLORIDE AND CARBON DIOXIDE

[75] Inventor: Thomas L. Wolford, Brush Prairie, Wash.

[73] Assignee: The Dow Chemical Company, Midland, Mich.

[21] Appl. No.: 382,333

[22] Filed: May 26, 1982

Related U.S. Application Data

[63] Continuation-in-part of Ser. No. 129,285, Mar. 11, 1980, abandoned, which is a continuation-in-part of Ser. No. 16,641, Mar. 1, 1979, abandoned.

[51] Int. Cl.³ .................. C01B 21/20; C01B 7/01
[52] U.S. Cl. .................... 423/437; 423/240; 423/245; 423/481
[58] Field of Search ............... 423/240, 245, 437, 481

[56] References Cited

U.S. PATENT DOCUMENTS 3,989,806 11/1976 Hyatt .............................. 423/437 X
3,989,807 11/1976 Johnston ........................ 423/437 X

OTHER PUBLICATIONS

Bond et al., "Catalyzed Destruction of Chlorinated Hydrocarbons", J. Appl. Chem. Biotechnol 1975, vol. 25, pp. 241-245.

Primary Examiner—Earl C. Thomas
Attorney, Agent, or Firm—M. L. Glenn

[57] ABSTRACT

A method of converting saturated aliphatic chlorinated hydrocarbons to carbon dioxide and hydrogen chloride which comprises contacting a pre-heated mixture of the hydrocarbon, oxygen and, where necessary, water with a molecular sieve catalyst at temperatures of from about 180° to about 400° C. Simple chlorinated hydrocarbons can thus be completely converted to HCl and $CO_2$ at low temperatures without the production of undesired by-products.

15 Claims, No Drawings

SELECTIVE CONVERSION OF CHLORINATED ALKANES TO HYDROGEN CHLORIDE AND CARBON DIOXIDE

CROSS-REFERENCE TO RELATED APPLICATION

This application is a continuation-in-part of my co-pending application Ser. No. 129,285, filed Mar. 11, 1980, now abandoned, which was a continuation-in-part of application Ser. No. 016,641, filed Mar. 1, 1979, now abandoned.

SUMMARY OF THE INVENTION

Saturated aliphatic chlorinated hydrocarbons are reacted with water and, where necessary, oxygen to produce carbon dioxide and HCl without substantial formation of undesired by-products in accordance with the subject method. This method comprises contacting at reactive conditions a vaporized mixture of the chlorinated hydrocarbon, at least a stoichiometric quantity of water and at least a stoichiometric quantity of oxygen with a suitable molecular sieve catalyst to convert at least 10 mole percent of said chlorinated hydrocarbon to carbon dioxide and hydrogen chloride.

Chloromethanes and other simple saturated chlorinated aliphatic hydrocarbons (hereinafter sometimes referred to as RCl's) can be selectively thermally reacted with water and oxygen at relatively low temperatures to yield $CO_2$ and HCl in essentially quantitative amounts. In this process no more than about ten mole percent of the chlorinated hydrocarbon reacted is converted to chlorine, $COCl_2$ and other chlorocarbon compounds.

DETAILED DESCRIPTION OF THE INVENTION

The method of the present invention concerns the conversion of a saturated aliphatic chlorinated hydrocarbon to carbon dioxide and hydrogen chloride without substantial formation of free chlorine or phosgene. This method comprises contacting a vaporized mixture containing said chlorinated hydrocarbon, water and, where necessary, oxygen with an effective amount of a suitable molecular sieve catalyst at a temperature and for a period of time sufficient to react said hydrocarbon selectively. Nitrogen or some other diluent inert in the reaction is optionally present in the vaporized mixture.

As used herein, the term suitable molecular sieve catalyst refers to an acid resistant molecular sieve catalyst which either is in the hydrogen form or is loaded with an alkali earth or rare earth metal, with the hydrogen form of the catalyst being preferred. As used herein, the term effective amount refers to that amount of catalyst which must be present for the desired reaction to occur at a rate such that the period of time required to react the RCl is not unreasonably long.

Illustrative RCl's which can be reacted in accordance with the present invention are saturated, aliphatic chlorinated hydrocarbons such as, for example, carbon tetrachloride, chloroform, 1,2-dichloropropane, 1,2-dichlorobutane, and the like or mixtures thereof. The term "chlorinated hydrocarbon" as used herein includes compounds derived from aliphatic hydrocarbons wherein at least one of the hydrogens on the carbon backbone has been replaced with chlorine. Optionally, the so-called "chlorinated hydrocarbon" may contain only carbon and chlorine moieties. Preferably, the RCl treated according to the present invention is selected from the group consisting of carbon tetrachloride, chloroform and 1,2-dichloropropane. The most preferred RCl is carbon tetrachloride.

The chlorinated hydrocarbon corresponds to the formula $C_nH_{(2n-b+2)}Cl_b$, wherein n is a whole number, preferably from 1 to 10 inclusive, more preferably no more than 5, most preferably no more than 3, and b is a whole number from 1 to $2n+2$ inclusive. The stoichiometric quantities of water and oxygen can then be calculated from the following formula for the reaction:

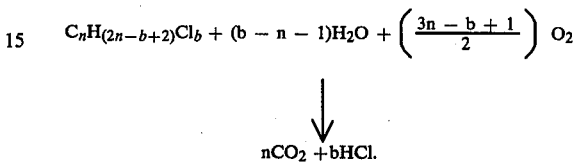

$$C_nH_{(2n-b+2)}Cl_b + (b-n-1)H_2O + \left(\frac{3n-b+1}{2}\right) O_2$$
$$\downarrow$$
$$nCO_2 + bHCl.$$

It is preferred to use greater than a stoichiometric amount of water, preferably at least a 25 mole percent excess, more preferably at least about 50 mole percent excess, most preferably at least a 100 mole percent excess. Where oxygen is required in the reaction, i.e., where the chlorinated hydrocarbon bears one or more hydrogen moieties, it is preferred that an excess of oxygen be employed. Preferably at least an 80 mole percent excess of oxygen is employed, more preferably at least about a 100 mole percent excess. Generally, the RCl content of the vaporized feed mixture is in the range from about 1 to about 30 mole percent, preferably from about 4 to about 15 mole percent.

Conveniently, a separate pre-heater apparatus is utilized to prepare the vaporized mixture. Streams of liquid RCl, air and water vapor are introduced into the preheater where the resulting mixture is simultaneously intermixed and heated to a temperature above about 100° C. Preferably the vaporized mixture is heated to a temperature in the range from about 120° to the operating temperature of the catalyst. Apparatus suitable for this purpose are well known in the art.

The pre-heated, vaporized RCl mixture is contacted with the catalyst in any reaction vessel affording the desired contact time and an otherwise suitable environment for the reaction. The manner in which the catalyst is disposed in the reactor is not generally critical so long as intimate contact between the catalyst and vaporized mixture occurs. Generally, a fixed bed or packed column is preferred, but a fluidized bed is also operable. The catalyst used in the subject process is preferably pre-heated to the desired temperature range prior to introduction of the vaporized RCl mixture. Inasmuch as the reaction is exothermic, the reaction vessel is advantageously equipped with some conventional means for cooling to maintain the desired catalyst temperature. The temperature of the catalyst is advantageously permitted to increase during the reaction until analysis of the exit stream indicates the desired conversion of the RCl has been achieved. Samples of the inlet and outlet gas streams are conveniently analyzed by gas chromatographic (GC) methods to provide a means for monitoring the degree and completeness of the oxidation. In addition to external cooling, the feed rate and ratio can be varied to moderate the temperature of the catalyst.

The catalyst is usually maintained at temperatures of from about 160° to about 400° C. during the reaction of RCl's. For example, 1,2-dichloropropane can be completely converted to $CO_2$ and HCl at temperatures of about 190° C., while carbon tetrachloride and chloroform are likewise completely converted at temperatures of about 240° to 310° C., respectively. A preferred catalyst reaction temperature is from about 180° C. to about 340° C., more preferably from about 190° to about 325° C.

The vaporized RCl mixture is desirably contacted with the catalyst at a pressure of at least about one atmosphere. A pressure somewhat greater than atmospheric pressure is generally preferred, with a pressure of from about 10 to about 30 pounds per square inch gauge (psig) being especially preferred.

The feed rate of the RCl mixture can be varied to provide a contact period with the catalyst which substantially converts the RCl to $CO_2$ and HCl. The contact time necessary to effect essentially complete conversion will vary depending on the RCl, the reaction temperature, the catalyst and other factors. In general, a contact time of from less than about 1 second to about 10 seconds will be sufficient to effect essentially complete conversion at temperatues above 300° C.

The subject method can be operated batchwise, but preferably is operated continuously. If the conversion of the RCl to $CO_2$ and HCl is undesirably low in a single pass, then either the residence time can be increased or multiple passes of the vaporized mixture through the catalyst bed can be utilized.

The catalysts which are employed in the present invention are acid-resistant type molecular sieves which are effective to convert a significant percentage or substantially all of the RCl being treated to $CO_2$ and HCl under the conditions of this invention. Catalysts which are not effective in so selectively converting the RCl to $CO_2$ and HCl, and chlorinated hydrocarbons which cannot be so converted by an effective catalyst as described herein are not deemed to be within the scope of the subject invention.

Molecular sieve catalysts of the Y-type, mordenite, zeolite, etc., in the hydrogen form or loaded with an alkali earth or rare earth metal can be employed in the present invention. Representative of these are the commercially available Linde Molecular Sieve Catalysts, such as Linde SK 609, LZ-Y 82, and the like (available from Union Carbide Corporation), Zeolons (available from Norton Chemical Process Products), and the like.

An ammonium form of the catalyst is operable but is advantageously first converted to the hydrogen form. One convenient method for conversion of the ammonium form of the catalyst to the hydrogen form is to load the catalyst into the reactor and heat it at high temperatures, e.g., from about 320° to about 420° C., under a nitrogen gas purge for a period of about 16 hours. The catalyst is then treated with dry $O_2$ for about 2 hours while the catalyst is gradually cooled to the temperature at which the RCl mixture is introduced.

In a preferred embodiment of this invention, a preheated vaporized mixture of the RCl containing amounts of water and oxygen in excess of the stoichiometric is contacted with a non-metal loaded, hydrogen form of a molecular sieve catalyst at temperatures of from about 190° to about 340° C. The vaporized mixture is introduced at a flow rate which provides a catalyst contact time of about 10 seconds. In conversion of $CCl_4$ the above-described procedure is operable, except only $CCl_4$ and $H_2O$ need be introduced and the temperature is preferably from about 190° to about 340° C., more preferably from about 220° to about 310° c.

The following examples further illustrate the practice of the subject invention.

EXAMPLE 1

A glass tubular reactor (13 mm×45 mm) was charged with about 100 ml of a molecular sieve catalyst (Linde LZ-Y82, available from Union Carbide Corp.) and heated to about 450° C. in the presence of a dry nitrogen purge for a period of about 16 hours. Dry oxygen was then fed into the reactor as the catalyst was cooled to about 150° C. The oxygen feed was continued for a period of about two hours before the RCl mixture was contacted with the catalyst.

A vaporized, pre-heated RCl mixture was prepared by thoroughly mixing streams of water vapor, carbon tetrachloride and air in a packed glass tube equipped with temperature control means and pre-heated to about 120° C. The vaporized mixture was then fed into the catalyst reactor at a pressure of about one atmosphere and contacted with the catalyst. Samples of the mixture entering and exiting the catalyst reactor were taken for G.C. analysis. The temperature of the catalyst was slowly permitted to increase until analysis of the exit stream indicated all of the $CCl_4$ had been converted to HCl and $CO_2$. The analysis was conducted by analyzing 5 ml portions of the feed and exit gas streams for $CCl_4$ content, the samples being injected directly into the entry port of an HP 5840A Gas Chromatograph. Mass balance calculations were also made by quenching the exit stream in chilled perchloroethylene and water, followed by absorption into neutral aqueous KI, and finally by scrubbing with NaOH. G.C. analysis of the quench solution indicated the amount of any unreacted RCl. The HCl absorbed in the quench water and the neutral KI was titrated with $AqNO_3$ and NaOH and added to the amount found in NaOH scrub solution. The amount of $CO_2$ found in the NaOH scrub solution was determined by titration with HCl.

As a result of these operations, it was determined that a vaporized $CCl_4$ feed mixture fed at a rate of 9.89 grams/hr of $CCl_4$ and 5.79 grams/hr of water (mole ratio of 1:5) was completely converted only to HCl (9.37 grams/hr) and $CO_2$ (3.09 grams/hr) at temperatures of at least about 240° C. or higher. No free $Cl_2$ was detected.

LZ-Y82 is a type Y zeolite having a faujasite structure and an aluminum to silicon ratio of about two. LZ-Y82 is described as an $\frac{1}{8}$ inch extrudate of the base catalysts 33-411 group purchased from Linde. It is purchased in the ammonium ($NH_4^+$) form and converted to the hydrogen form by known thermal procedures.

EXAMPLE 2

The operations of Example 1 above were repeated, using other RCl mixtures, with air also being mixed with the vaporized RCl mixture. The RCl mixtures and catalytic temperatures required to obtain 100% conversion of the RCl's to HCl and $CO_2$ are set forth in the following table, no free $Cl_2$ being detected:

TABLE I

| *RCl Mixture (Mole Ratio) | Catalyst Temp. (°C.) | Conversion % | Products |
|---|---|---|---|
| 1. $CHCl_3:H_2O:O_2$** (1:5:4) | 310 | 100 | HCl, $CO_2$ |

TABLE I-continued

| *RCl Mixture (Mole Ratio) | Catalyst Temp. (°C.) | Conversion % | Products |
|---|---|---|---|
| 2. PDC:H$_2$O:O$_2$ (1:5:4) | 190 | 100 | HCl, CO$_2$ |
| 3. PDC/CCl$_4$***:H$_2$O:O$_2$ (1:5:4) | 240 | 100 | HCl, CO$_2$ |
| 4. CHCl$_3$/CCl$_4$***:H$_2$O:O$_2$ | 310 | 100 | HCl, CO$_2$ |

*Average contact time of about 10 seconds.
**O$_2$ feed as compressed air in all runs.
***RCl wt. % composition was 85% CCl$_4$ and 15% PDC (1,2-dichloropropane) for Run 3 and 85% CCl$_4$ and 15% CHCl$_3$ for Run 4.

A ten-fold increase in the feed rate indicated all but trace amounts of CCl$_4$ and CHCl$_3$ were reacted, with a greater reaction temperature resulting from increased heat release.

EXAMPLE 3

Using essentially the same procedure set out in Example 1 above except that the catalyst employed was ZEOLON 900 (trademark of Norton Company) in the sodium form. A vaporized carbon tetrachloride feed mixture being fed at a rate of 0.33 g/min of carbon tetrachloride and 0.56 g/min of water was completely converted to hydrogen chloride and carbon dioxide at 250° C. No free chlorine gas was detected.

ZEOLON 900 is a synthetic mordenite having a five-membered ring system which is characterized by a collection of one-dimensional pores of 6.7 angstroms diameter. ZEOLON 900 has a silica to alumina ratio of ten. It is described as self-bonded and is available from Norton Chemical Company as either a ⅛ inch or 1/16 inch extrudate. It is available in either the hydrogen or the sodium form.

EXAMPLE 4

A steel tubular reactor having an internal diameter of 2 inches and a length of 6 feet was packed with 3680 cubic centimeters of ZEOLON 900 in the hydrogen form. The reactor was equipped with a cooling jacket through which a heat transfer fluid could be conducted and a means for sensing temperature.

Two liquid feed streams were separately preheated to a temperature of 250° C. The first stream consisted of carbon tetrachloride introduced to the preheater at a rate of 9.47 grams per minute. The second stream consisted of water introduced at a rate of 17.37 grams per minute, a 680 mole percent excess over the stoichiometric amount. The resulting heated vaporized streams of water and carbon tetrachloride were thoroughly intermixed as they were produced.

The vaporized mixture was introduced into one end of the tubular reactor and passed through the packed catalyst at a pressure of about 8.5 psig. The catalyst temperature varies during the reaction and along the length of the reactor reaching a maximum temperature of about 332° C. in the first third of the bed. The contact time with the catalyst was about 10 seconds.

Analysis of the product gas by conventional analytical methods indicated the CCl$_4$ in the feed had been essentially completely converted to HCl and CO$_2$. No chlorine gas was detected in the product.

The foregoing examples illustrate the method of the present invention in completely converting RCl's to desired HCl and CO$_2$ products. Other like RCl's or mixtures can also be oxidized by the method of the present invention and those skilled in the art will recognize that various modifications may be made in the invention without departing from the spirit or scope thereof and it is understood that the invention is limited only as defined in the appended claims.

What is claimed is:

1. A method of reacting at least one saturated aliphatic chlorinated hydrocarbon to selectively produce carbon dioxide and hydrogen chloride which comprises contacting a vaporized mixture containing said chlorinated hydrocarbon, at least a stoichiometric quantity of water and at least a stoichiometric quantity of oxygen with an effective amount of a suitable molecular sieve catalyst at a temperature and for a sufficient period of time to convert at least 10 mole percent of said chlorinated hydrocarbon to carbon dioxide and hydrogen chloride without substantial formation of free chlorine and phosgene.

2. The method of claim 1 wherein the vaporized mixture further comprises an inert diluent.

3. The method of claim 1 wherein the temperature of the molecular sieve catalyst during contact between the vaporized mixture and the catalyst is in the range from about 160° C. to about 400° C.

4. The method of claim 1 wherein said catalyst is employed in hydrogen form.

5. The method of claim 4 wherein said catalyst comprises a Y-type or mordenite zeolite catalyst.

6. The method of claim 5 wherein the temperature of the molecular seive catalyst is in the range from about 160° to about 400° C.

7. The method of claim 5 wherein the catalyst temperature is in the range from about 180° to about 340° C.

8. The method of claim 5 wherein the chlorinated hydrocarbon is selected from the group consisting of carbon tetrachloride, chloroform, 1,2-dichloropropane and 1,2-dichlorobutane.

9. The method of claim 8 wherein the catalyst temperature is in the range from about 190° to about 325° C.

10. The method of claim 6 wherein the chlorinated hydrocarbon is 1,2-dichloropropane.

11. The method of claim 6 wherein the vaporized mixture consists of carbon tetrachloride and at least a stoichiometric amount of water.

12. The method of claim 6 wherein the chlorinated hydrocarbon is chloroform.

13. The method of claim 6 wherein the chlorinated hydrocarbon has from 1 to 10 carbon atoms inclusive.

14. The method of claim 13 wherein the chlorinated hydrocarbon has no more than 5 carbon atoms.

15. The method of claim 13 wherein the chlorinated hydrocarbon has no more than 3 carbon atoms.

* * * * *